United States Patent [19]
Solomon

[11] Patent Number: 6,011,801
[45] Date of Patent: Jan. 4, 2000

[54] RATE CONTROL OF CHANNELS ON A TIME DIVISION MULTIPLEX BUS

[75] Inventor: David Solomon, River Vale, N.J.

[73] Assignee: Timeplex, Inc., Woocliff Lake, N.J.

[21] Appl. No.: 08/948,270

[22] Filed: Oct. 9, 1997

[51] Int. Cl.[7] .............................. H04L 12/40; H04L 12/43
[52] U.S. Cl. .............................................. 370/439; 370/458
[58] Field of Search .................................... 370/468, 294,
370/431, 438, 439, 458, 462, 347, 465;
340/825.5, 825.52, 825.08; 455/434

[56] References Cited

U.S. PATENT DOCUMENTS

| | | | |
|---|---|---|---|
| 4,413,336 | 11/1983 | Chaillie et al. | 370/48 |
| 4,805,167 | 2/1989 | Leslie et al. | 370/84 |
| 4,980,886 | 12/1990 | Bernstein | 370/80 |
| 5,020,055 | 5/1991 | May, Jr. | 370/94 |
| 5,027,349 | 6/1991 | Thorne | 370/85.1 |
| 5,077,732 | 12/1991 | Fischer et al. | 370/85.4 |
| 5,343,469 | 8/1994 | Ohshima | 370/85.1 |
| 5,400,328 | 3/1995 | Burren et al. | 370/79 |
| 5,467,344 | 11/1995 | Solomon et al. | 370/58.3 |
| 5,528,579 | 6/1996 | Wadman et al. | 370/15 |
| 5,537,410 | 7/1996 | Li | 370/84 |
| 5,592,480 | 1/1997 | Carney et al. | 370/347 |
| 5,608,883 | 3/1997 | Kando et al. | 395/309 |
| 5,778,316 | 7/1998 | Persson et al. | 455/434 |

*Primary Examiner*—Chi H. Pham
*Assistant Examiner*—Brenda H. Pham
*Attorney, Agent, or Firm*—Irwin Ostroff; Robert B. Ardis

[57] ABSTRACT

Information flow in the form of individual channels of digital data across a time division multiplex (TDM) bus is controlled when the bandwidth $b_c$ of an individual channel may not be integrally related to the bandwidth $b_t$ of individual time slots of the TDM bus. A channel is assigned to a selected number m of TDM bus time slots, where m=n and the relationship between $b_c$ and $b_t$ is given by the expression $(n-1)b_t < b_c \leq nb_t$. Sequential bytes of data from the channel are transmitted during data byte opportunities in the channel's selected time slots. A validity identification signal is generated for each data byte transfer opportunity in the selected time slots, and a predetermined binary state is transmitted substantially simultaneously with each data byte transfer opportunity. A VALID signal is transmitted, independently of the TDM bus, substantially simultaneously with each data byte transfer opportunity filled by the channel. To permit selected bandwidth in the reverse direction to be controlled over a bidirectional TDM bus, a separate bandwidth request signal may also be transmitted, substantially simultaneously with data byte transfer opportunities in the forward direction but also independently of the TDM bus.

10 Claims, 5 Drawing Sheets

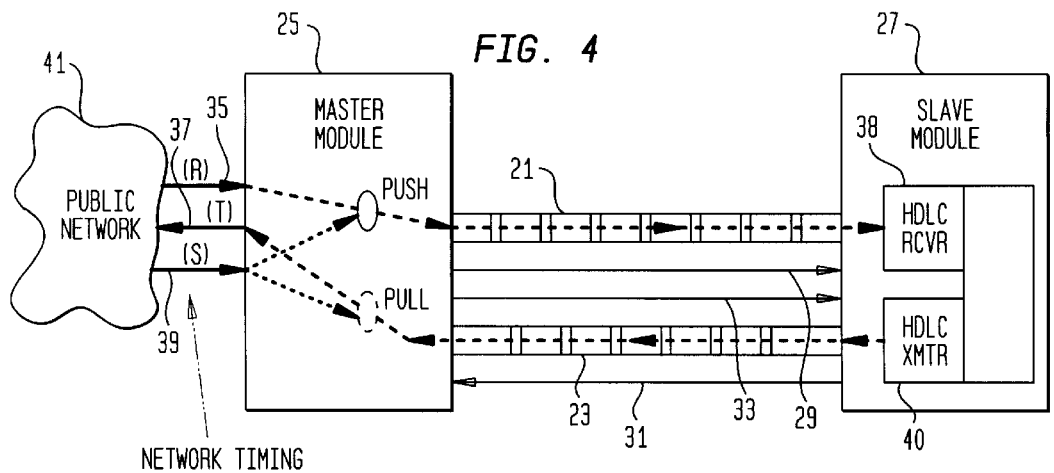
FIG. 4
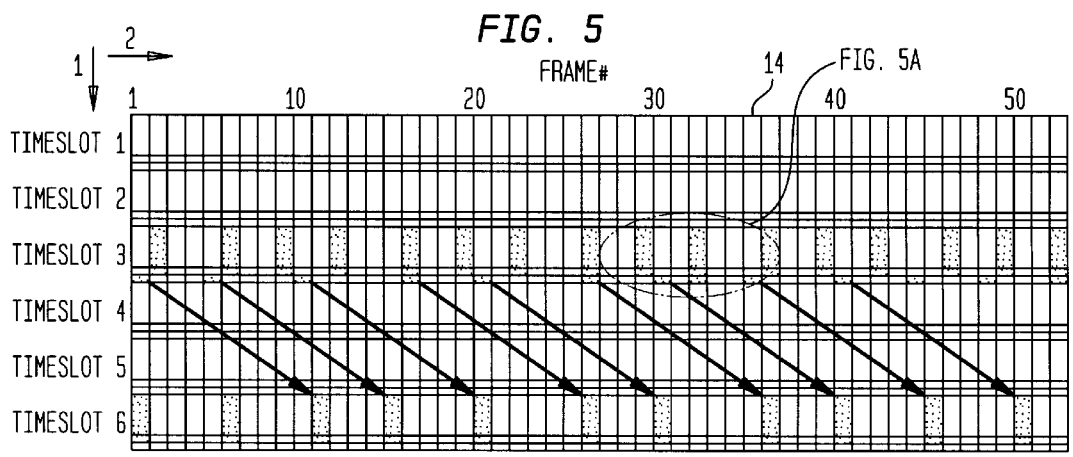
FIG. 5
FIG. 5A

RATE CONTROL OF CHANNELS ON A TIME DIVISION MULTIPLEX BUS

FIELD OF THE INVENTION

This invention relates to methods and apparatus for controlling information flow in the form of individual channels of digital data across a time division multiplex (TDM) bus when the bandwidth of individual channels may not necessarily be integrally related to the bandwidth of individual time slots of the TDM bus and to methods and apparatus for controlling such information flow from either end of a bidirectional or full duplex TDM bus.

BACKGROUND OF THE INVENTION

A TDM bus transports sequential time domain frames, each of which is divided into a plurality of sequential time slots. Every time slot carried by the TDM bus comprises a sequence of data byte transfer opportunities, each of which is interleaved with respective data byte transfer opportunities of the remaining time slots. Each time slot carried by a typical TDM bus has the same predetermined bandwidth $b_t$.

Multiple channels of digital data are customarily transmitted over such a TDM bus, with the channels each having a bandwidth $b_c$, where $b_c = nb_t$ and n is a positive integer. In other words, each channel of digital data customarily transmitted over a TDM bus has a bandwidth $b_c$ either equal to $b_t$ or equal to an integral multiple of $b_t$.

In typical digital data channels, each data byte comprises 8 data bits. In a TDM bus, each data byte transfer opportunity accepts such 8 bit data bytes, and a byte clock is used to transfer data from a module at one end of the TDM bus to another module at the other. An 8 KHz timing reference is used for the modules at both ends of the TDM bus to identify the beginning of each TDM bus frame. Time slots of the TDM bus frame are uniquely identified by end modules on the bus, using time slot numbers corresponding to the respective number of byte clock periods elapsed from the 8 KHz timing reference. Each module is assigned a specific set of one or more time slots for each channel for which it is to transmit data, and for each channel from which it is to receive data.

Typically, each time slot carried by a TDM bus corresponds to a 64 Kbps simplex channel, with the byte clock frequency determining the total number of time slots on the bus and thus the total bandwidth supported across the TDM bus. By way of example, a 20 MHz byte clock yields 2500 time slots or 160 MHz of bandwidth. To transmit a fixed rate channel that is frequency locked to the bus clock and has a data rate of n×64 Kbps, n time slots are needed, where n is a positive integer. Each byte transfer opportunity in the assigned set of time slots is used for transfer of data from a source module at one end of the TDM bus to a destination module at the other.

A problem can arise if it becomes necessary to transmit over the same TDM bus not only channels whose bandwidth $b_c$ is either equal to $b_t$ or equal to an integral multiple of $b_t$, but also channels whose bandwidth $b_c$ may be either greater or less than $b_t$ or an integral multiple of $b_t$, while also maintaining frame alignment. The problem becomes even more complex if it also becomes necessary to transmit over the same TDM bus channels whose bandwidth $b_c$ may change on a dynamic basis. Although it might be possible to convert off-bandwidth channels (those where $b_c$ is not equal to $nb_t$) to standard bandwidths (those where $b_c = nb_t$) prior to application to a single TDM bus for transmission, such an approach would necessitate adding an undesirable amount of complex hardware. When transmitting off-bandwidth channels, it may also be desirable to have an ability to control the transmission of such channels from either end of a bidirectional or duplex TDM bus.

In other words, in order to maintain maximum flexibility, it may be desirable for modules at both ends of a TDM bus to (1) support 64 Kbps channel data rates, (2) support super-rate channel data rates (i.e., rates >64 Kbps), (3) support sub-rate channel data rates (i.e., rates <64 Kbps), (4) support asymmetrical channels (different rate in each direction), (5) support multiple channels simultaneously (i.e., multiplexed channels), (6) support channels without regard to the data format of each channel, (7) maintain byte alignment for pulse code modulation (PCM) channels, (8) maintain frame alignment for hyper channels (n×64 Kbps, where n >1), (9) support variable rate channels (channels that change bit rate on a dynamic basis), (10) support co-directional channel timing (each end controls its own transmit data rate), and (11) support contra-directional channel timing (one end controls data rate on both directions of a full duplex channel).

SUMMARY OF THE INVENTION

From one important aspect of the invention, each digital data channel to be transmitted over a TDM bus is assigned to a selected number m of the TDM bus time slots, where m=n and the relationship between $b_c$ and $b_t$ is given by the expression $(n-1)b_t < b_c \mu\, nb_t$. In other words, m is selected so that the channel bandwidth is greater than (n−1) times the TDM bus time slot bandwidth and either equal to or less than n times the TDM bus time slot bandwidth. From this aspect of the invention, for each channel to be transmitted, a validity identification signal is generated for each data byte transfer opportunity in the selected time slots. Sequential bytes of digital data from each channel are transmitted during data byte opportunities in the respective channel's selected time slot. From this aspect of the invention, for each channel a first digital state (a VALID signal) is transmitted as the validity identification signal substantially simultaneously with each data byte transfer opportunity filled by that channel, and for each channel a second digital state (absence of a VALID signal) is transmitted as the validity identification signal substantially simultaneously with each data byte transfer opportunity left unfilled by that channel. In this manner, standard bandwidth channels, off-bandwidth channels, or any mix of standard and off-bandwidth channels, may be transmitted with equal facility over the same TDM bus.

In a module at the receiving end of the TDM bus, from this aspect of the invention, only data bytes received substantially contemporaneously with a validity identification signal of the first digital state (a VALID signal) are accepted as valid. Data bytes received substantially contemporaneously with a validity identification signal of the second digital state (absence of a VALID signal) are ignored. In this manner, each channel is permitted to use only those TDM bus time slots data byte transfer opportunities needed to accommodate its bandwidth $b_c$, while the TDM bus remains able to maintain both byte and frame alignment no matter what mix of channels may be transmitted.

From one aspect of the invention, data bytes are transmitted during all data byte transfer opportunities in the first (m−1)th of the selected time slots and during less than all data byte transfer opportunities in the (m)th of the selected time slots. Thus, if m=2, all data byte transfer opportunities in the first of the selected time slots are used and less than all data byte transfer opportunities in the second are used.

To enable a bidirectional or duplex TDM bus transmitting standard bandwidth channels, off-bandwidth channels, or any mix of standard and off-bandwidth channels to be controlled from either end, from another aspect of the invention a bandwidth request signal is generated for each data byte transfer opportunity in time slots in one direction. For each duplex channel, from this aspect of the invention a first digital state (a RQST signal) is transmitted as the bandwidth request signal substantially simultaneously with enough data byte transfer opportunities in the bus in the selected m time slots in that direction so that sufficient bandwidth is provided to accommodate that channel in the opposite direction. A second digital state (absence of a RQST signal) is transmitted as the bandwidth request signal substantially simultaneously with all other data byte transfer opportunities and is ignored. To provide the needed bandwidth, each RQST signal causes a byte of data to be transmitted over the TDM bus in the opposite direction substantially contemporaneously with a VALID signal as the validity identification signal.

The invention may be more fully understood from the following detailed description of several specific examples, considered in the light of the accompanying drawings and the appended claims.

BRIEF DESCRIPTION OF THE DRAWINGS

FIG. 4 is a block diagram of a TDM bus transporting data between a master module and a slave module, with full duplex transmission and both validity identification signal and bandwidth request signal links interconnecting the master and slave modules in accordance with the invention;

FIG. 5 is a timing diagram for the operation of FIG. 3;

FIG. 5A is an expanded portion of FIG. 5;

DETAILED DESCRIPTION

Figure 1:
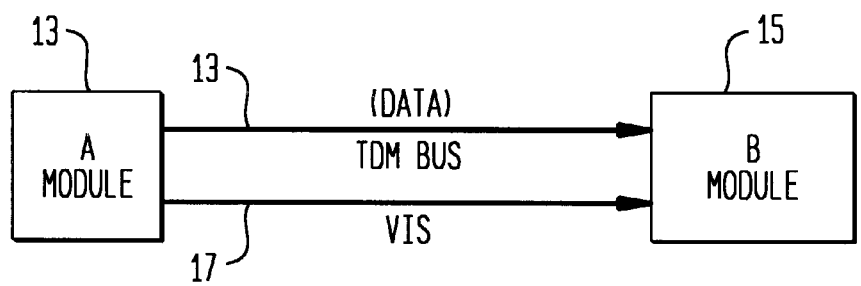
FIG. 1 is a block diagram of a TDM bus transporting data between A and B modules, with a validity identification signal link interconnecting the A and B modules in accordance with the invention.

In FIG. 1, a TDM bus 11 is arranged to transport data between an A module 13 and a B module 15. In a one-way left to right system, A module 13 serves as a source module and B module 15 serves as a destination module. A validity identification signal (VIS) link 17 interconnects A module 13 and B module 15 independently of TDM bus 11.

Figure 2:
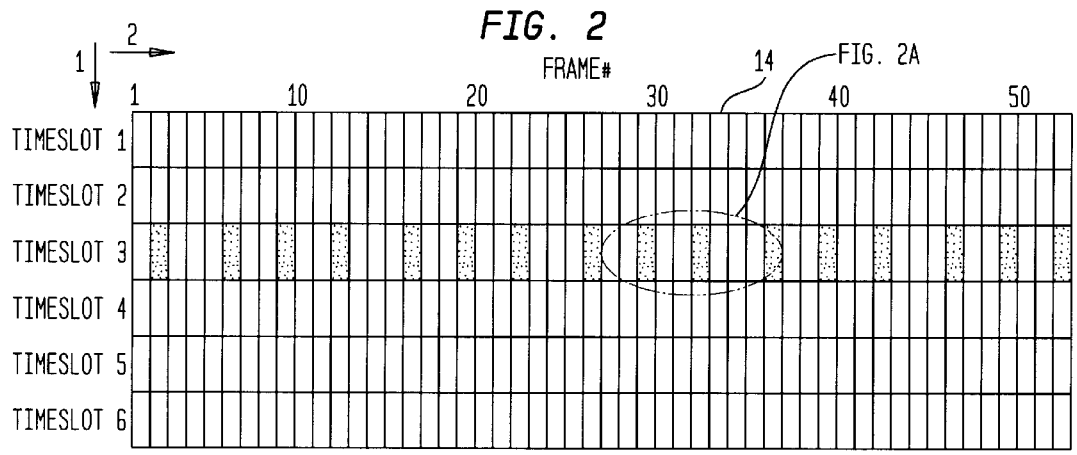
FIG. 2 is a timing diagram illustrating how a channel operating at less than 64 Kbps is transmitted across a single time slot in a TDM bus in accordance with the invention.

The timing diagram shown in FIG. 2 illustrates transmission of a sub-rate channel over TDM bus 11 in FIG. 1 when TDM bus 11 is designed to support 64 Kbps as a standard single channel rate. Specifically, the sub-rate channel shown in FIG. 2 is a 19.2 Kbps data stream whose timing is driven by A module 13 across TDM bus 11.

In a main portion 14 of the timing diagram illustrated in FIG. 2, each rectangle represents a data byte transfer opportunity on TDM bus 11. In that portion, each column (the time sequence of which is indicated by the vertical arrow marked 1) represents a frame on TDM bus 11 and each row (the time sequence of which is indicated by the horizontal arrow marked 2) represents a different time slot on that bus. Thus, the first row in the main portion 14 of FIG. 2 represents time slot 1, the second row represents time slot 2, and so on. Similarly, the left-most column in the main portion of FIG. 2 represents frame 1, the next represents frame 2, and so on.

The time sequence of the data byte transfer opportunities in the main portion 14 of FIG. 2 is down each column (frame) and then advancing to the top of the next column from left to right. Each row represents a different 64 KHz time slot, numbered relative to an 8 KHz timing reference signal. The columns, moving from left to right, represent consecutive 125 microsecond frames. In the illustrated example, a data channel has been assigned time slot 3 and supplies data 3 times every 10 frames on average, for a data rate of 19.2 Kbps (64 Kbps/$10^3$). The data channel concerned is thus a sub-rate channel. Transmission of data bytes during data byte opportunities 3 out of every 10 consecutive frames during time slot 3 is indicated by the shaded rectangles.

Figure 2A:
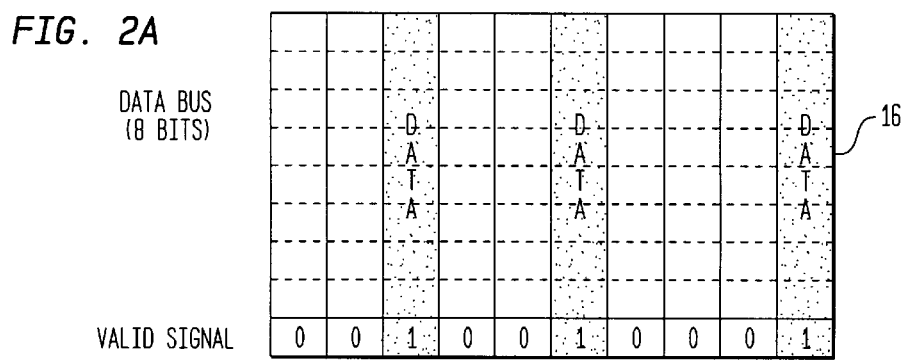
FIG. 2A is an expanded portion of FIG. 2.

An expanded portion 16 of FIG. 2 shown in FIG. 2A illustrates transmission across TDM bus 11 at the bit (as opposed to byte) level. Rows in this portion represent bits (each byte contains 8 bits) and columns, as in the main portion, represent frames. The expanded portion 16 in FIG. 2A of FIG. 2 shows 10 consecutive frames (frames 27 through 36 in the main portion 14 of FIG. 2). The uppermost 8 rows in the expanded portion 16 in FIG. 2A of FIG. 2 represent bit transfer opportunities in successive frames, while the bottom row represents validity identification signals transmitted in accordance with the present invention. In other words, the uppermost 8 rows represent data bits transmitted over TDM bus 11, while the bottom row represents validity identification signals generated and transmitted independently of the TDM bus from a source module at one end of the TDM bus to a destination module at the other. The shaded rectangles represent bit transfer opportunities during which data and VALID signals are actually transmitted.

As illustrated in the expanded portion 16 in FIG. 2A of FIG. 2, a first digital state (binary "1", i.e., a VALID signal) is transmitted as a validity identification signal in the chosen time slot during those frames in which data is being transmitted. A second digital state (binary "0", i.e., absence of a VALID signal) is transmitted as the validity identification signal in that time slot during all other frames. In other words, during every data byte transfer opportunity with valid data present, A module 13 transmits binary "1" (i.e., a VALID signal) as the validity identification signal, indicating to all destination modules that valid data is present. Because binary "0" (i.e., absence of a VALID signal) is transmitted as the validity identification signal when valid data is not present, all other data byte opportunities are ignored by B module 15, which is serving as a destination module.

Figure 3:
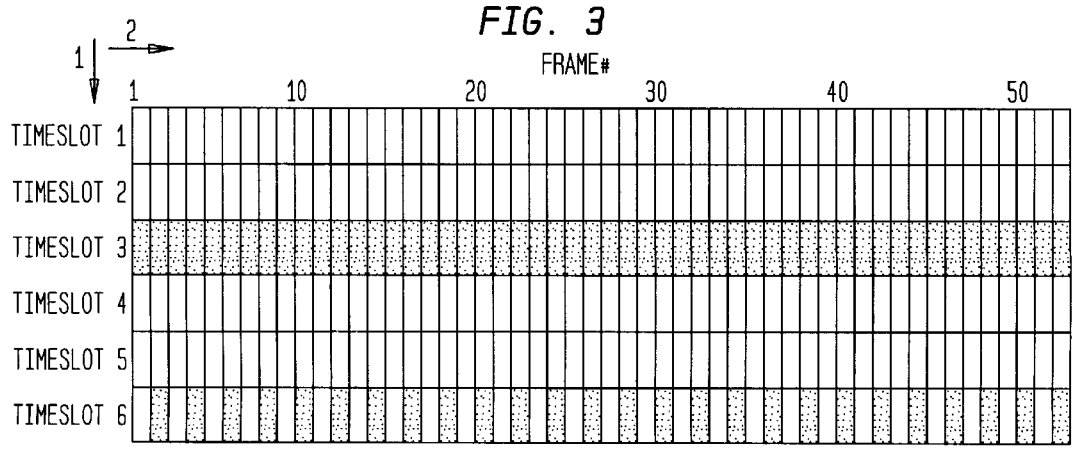
FIG. 3 is a timing diagram illustrating how a channel operating at more than 64 Kbps is transmitted across two time slots in a TDM bus in accordance with the invention.

FIG. 3 is a timing diagram illustrating transmission of a super-rate channel from A module 13 to B module 15 over TDM bus 11 in FIG. 1, where TDM bus 11 is designed to support 64 Kbps as a standard single channel rate. In FIG. 3, the super-rate channel has a data rate of 96 Kbps. Once again, A module 13 serves as a source module and B module 15 as a destination module.

FIG. 3 illustrates the manner in which a super-rate channel of 96 Kbps is spread across two time slots of the TDM bus. The timing diagram in FIG. 3 is like FIG. 2 in that each rectangle represents a data byte transfer opportunity on the TDM bus. Each column (the sequence of which is indicated by the vertical arrow marked 1) represents a frame on the bus and each row (the sequence of which is indicated by the horizontal arrow marked 2) represents a different time slot. Thus, in FIG. 3, the first row represents time slot 1, the second row represents time slot 2, and so on. Similarly, the left-most column in FIG. 3 represents frame 1, the next represents frame 2, and so on.

In the example illustrated in FIG. 3, the 96 Kbps channel is assigned to time slots 3 and 6, occupying all of data byte transfer opportunities (64 Kbps) in time slot 3 and half of the data byte transfer opportunities (32 Kbps) in time slot 6. In accordance with the invention, during every data byte transfer opportunity, binary "1" (i.e., a VALID signal) is generated and transmitted independently of TDM bus 11 over a validity identification signal link 17 from A module 13 at one end of TDM bus 11 to B module 15 at the other. Once again, because transmission is from left to right, A module 13 serves as a source module and B module 15 as a destination module.

The shaded rectangles in FIG. 3 represent data byte transfer opportunities during which data from the channel in question is actually transmitted. Substantially simultaneously with each (shaded rectangle) data byte transfer opportunity containing data, the validity identification signal is transmitted in the form of binary "1" (i.e., a VALID signal). Contemporaneously with all other data byte transfer opportunities (i.e., those not containing data), the validity identification signal is transmitted in the form of binary "0" (i.e., absence of a VALID signal). At B module 15, data byte opportunities accompanied by binary "0" as the validity identification signal are ignored. In this manner, the super-rate channel data is spread across both assigned time slots, with source module 13 maintaining byte sequence integrity and asserting binary "1" as the validity identification signal for each byte of data transferred.

Not all devices are able to frequency lock to external timing sources and special consideration is made for such types of data sources. Data sources of this type include devices using communication controllers that transmit data based on a free running oscillator. An example of such a device uses High Level Data Link Control (HDLC), a communications protocol specified by the International Standards Organization (ISO).

Although such a controller may transmit at a nominal data rate of 64 Kbps, if the source of timing for the channel data is not frequency locked to a byte clock on TDM bus 11, it may actually operate slightly slower or slightly faster than the bandwidth of a single time slot. This unlocked channel is, therefore, assigned 2 time slots on TDM bus 11 and source module 13 marks the valid data transfers with binary "1" (i.e., a VALID signal) as the validity identification signal in the manner described above in connection with both sub-rate and super-rate channels. The same pattern applies to unlocked channels operating at (n×64) Kbps, for which (n+1) time slots are assigned on the TDM bus.

Although the discussion associated with FIGS. 2 and 3 has focused on channels with fixed data rates, the same mechanisms apply for variable rate channels. Variable rate channels are channels with bit rates that change on a dynamic basis. An example of this type of channel is one is that carries a variable rate packet data stream and shares a TDM facility with switched TDM channels (see, e.g., U.S. Pat. No. 5,467,344, issued Nov. 14, 1995 to David Solomon, Zigmunds A. Putnins, David W. Gish, and Jeffrey B. Mendelson). As TDM channels are connected and disconnected, the bit rate of the packet channel can breathe (i.e. expand and contract) to occupy all available bandwidth on the TDM bus.

In accordance with the present invention, variable rate channels are assigned a sufficient number of time-slots to over-scan the maximum data rate of the channel. For example, a channel that will vary in bandwidth between 1200 bps and 112,000 bps is assigned two time-slots for 128,000 bps worth of data byte transfer opportunities. As in the previously described examples, a validity identification signal in the form of binary "1" (a VALID signal) is transmitted contemporaneously with each data byte from the variable rate channel from source module 13 to destination module 15. At the receiving module, the contents of all data byte opportunities accompanied by binary "1" (a VALID signal) as the validity identification signal are accepted as valid data and the contents of those accompanied by binary "0" as the validity identification signal are ignored.

A co-directional channel is a full duplex channel transported across a bidirectional TDM bus wherein the offspeed timing of the channel data for each direction of transmission is controlled by the module that is the source of data for that direction. In other words, timing for transmission from left to right over TDM bus 11 in FIG. 1 is controlled by A module 13 at the left hand end of TDM bus 11, while timing for transmission from right to left over TDM bus 11 is controlled by B module 15. In such an arrangement, module 15 becomes a source module for data originating at its end of TDM bus 11, while module 13 becomes a destination module for data received at its end of TDM bus 11 from module 15. When TDM bus 13 in FIG. 1 is bi-directional, assume that arrowheads appear at both ends and that arrowheads appear at both ends of VIS link 17 as well.

In accordance with the invention, each direction of a co-directional channel is assigned time slots in a TDM bus in the manner described above, and the module that provides data for that direction also imparts the validity identification signal to control the data rate.

FIG. 4 is a block diagram of an arrangement based upon a contra-directional channel. A contra-directional channel is a full duplex channel transported across a pair of oppositely directed TDM buses in which the speed for both directions of transmission is controlled by one module (typically, but not necessarily, an interface module) at the same end of both buses. In FIG. 4, a first TDM bus 21 carries data from left to right and a second TDM bus 23 carries data from right to left. A master module 25 at the left-hand end of TDM buses 21 and 23 controls the channel timing for both directions of transmission and operates both (1) to push data to a slave module 27 at the right-hand end of TDM bus 21 and (2) to pull data from slave module 27, which serves as the source of data for the reverse direction of transmission.

The data pulled from slave module 27 is transmitted to master module 25 over TDM bus 23. A first validity identification signal (VIS) link 29 is connected from master module 25 to slave module 27, a second validity identification signal link 31 is connected from slave module 27 to master module 25, and a bandwidth request signal link 33 is connected from master module 25 to slave module 27. Master module 25 may, if appropriate, be connected through a received data (R) link 35, a transmitted data (T) link 37, and timing (S) link 39 to a public network, represented in FIG. 4 by element 41. In the example shown, slave module 27 includes an HDLC receiver (RCVR) 38 and an HDLC transmitter (XMTR) 40.

FIG. 5 is a timing diagram illustrating contra-directional transmission over the system shown in FIG. 4 and contains a main portion 14 an expanded portion 16 of which is shown in FIG. 5A. As in FIG. 2, in the main portion 14 in FIG. 5, each rectangle represents a data byte transfer opportunity. In that portion, each column (the sequence of which is indicated by the vertical arrow marked 1) represents a frame on TDM buses 21 and 23 and each row (the sequence of which is indicated by the horizontal arrow marked 2) represents a different time slot. Again, the time sequence of the data byte transfer opportunities is down each column (frame) and then advancing to the top of the next column from left to right.

The expanded portion 16 of FIG. 5 shown in FIG. 5A illustrates transmission across TDM buses 21 and 23 at the bit (as opposed to byte) level. Rows in this portion represent bits (each byte contains 8 bits) and columns, as in the main portion, represent frames. The expanded portion 16 in FIG. 5A shows consecutive frames (frames 27 through 36 in the main portion 14 in FIG. 5). The uppermost 8 rows in the expanded portion of FIG. 5 represent bit transfer opportunities in successive frames, while the bottoms rows represent validity identification signals and bandwidth request signals, respectively, both transmitted in accordance with the present invention. In other words, the uppermost 8 rows represent data bits transmitted over TDM bus 21 from master module 25 to slave module 27, the next to bottom row represents validity identification signals generated and transmitted independently (as separate signals) of either TDM bus from master module 25 to slave module 27, and the bottom row represents bandwidth request signals generated and transmitted independently of either TDM bus from master module 25 to slave module 27. The shaded rectangles represent bit transfer opportunities during which data, VALID, and RQST signals are actually transmitted.

As illustrated in the expanded portion 16 in FIG. 5A, a first digital state (binary "1", i.e., a RQST signal) is transmitted as a bandwidth request signal in the chosen time slot during selected frames, not necessarily the same frames in which data is being transmitted. A second digital state (binary "0", i.e., absence of a RQST signal) is transmitted as the bandwidth request signal in that time slot during all other frames.

As illustrated in the main portion 14 in FIG. 5, where data is transmitted in the slave to master (right to left) direction over TDM bus 23 in time slot 6, there is a delay of approximately 10 frames from the time a RQST signal is transmitted from master module 25 in the left to right direction to the time bandwidth is allocated in the slave to master (right to left) direction. As shown, transmission of data in the slave to master (right to left) direction over TDM bus 23 is accompanied by transmission of VALID signals over validity identification signal link 31.

In a specific example, master module 25 in FIG. 4 may be an X.25 Interface, and slave module 27 may be an HDLC Packet Processor. The two modules used in conjunction with one another provide a complete interface for a packetized data link. Functionality is partitioned between the two modules following the layering concepts outlined in communications models such as the Open Systems Interconnection Reference Model (ISO 7498). One aspect of this layering involves separation of the functions provided at a Physical Layer and at a Data Link Layer. In this instance, X.21 is the specification for the physical layer and HDLC is the specification for the data link layer.

Separation of the layers using this generic bus interface allows functionality in the physical layer such as signal levels, impedance, and data rate to be substituted independently of the higher layer functionality (e.g., data link layer functionality such as packet framing, data transparency, and cyclic redundancy checking). For example, the X.21 module may be changed to a T1 (T1 carrier) or E1 (E1 carrier, the European equivalent of T1) interface module and the data arriving on that T1 or E1 physical layer interface may still be processed on the same HDLC module.

Likewise, the HDLC module may be replaced with a PCM voice processing module or an asynchronous transfer mode (ATM) cell processing module, and used in conjunction with the same T1 or E1 interface module described above. This ability to mix and match physical layer and datalink layer modules across a generic bus allows the total number of module types required to be minimized since there need only be one module designed for each physical interface type and one module designed for each higher layer function to be supported. There is no need to provide a different module for every possible combination of physical layer and higher layer function (e.g., X.21/HDLC, T1/HDLC, T1/ATM, X.21.ATM, T1/Voice, E1/Voice, E1/ATM, E1/HDLC, etc.)

On a Data Terminal Equipment (DTE) interface, where timing for both the receive and transmit portions of master module 25 are provided by either network 41 or a modem (not shown), the data transmitted from module 27 needs to be pulled from TDM bus 23 at a rate consistent with the clock rate at the interface. To meet this requirement, a bandwidth request signal is transmitted from master module 25 to slave module 27 over bandwidth request signal link 33. Each time a byte is required by master module 25 (in this example, an X.21 Interface) for transmission over TDM bus 23 to network 41, a bandwidth request signal in the form of binary "1" (i.e., a RQST signal) is asserted in the TDM bus 23 time slots assigned to the master-to-slave (receive data) direction of the channel. The RQST signal is independent of any data flowing in those time-slots and may occur on byte clocks with or without valid data. Slave module 27 (in this example, an HDLC packet processor), upon receiving a RQST signal, sources a single data byte in the time-slots assigned to the slave-to-master (transmit data) direction along with the assertion of a VALID signal on valid identification signal link 29. Data for the master-to-slave (left to right) direction is transferred in the manner described in the co-directional example, with master module 25 as the source of both data and the VALID signal.

FIG. 5 illustrates the manner in which the master to slave (left to right) direction of a full duplex channel is assigned to time-slot 3 and the slave-to-master (right to left) direction of the channel is assigned to time-slot 6. In addition to being the data source for time-slot 3, master module 25 asserts a RQST signal in time-slot 3 each time it requires another byte in the slave-to-master (right to left) direction. Following a fixed time delay to allow slave module 27 to receive the request and prepare a byte for transmission, slave module 27 sources a data byte to time-slot 6 and asserts the VALID signal.

The same mechanism for contra-directional timing is also used for asymmetrical channels, variable rate channels, and unlocked super-rate channels. For each of these, the number of time-slots assigned in the master-to-slave direction is equal to or greater than the number of time-slots assigned in the slave-to-master direction. This provides sufficient opportunities to transport the RQST signal to slave module 27 in support of the reverse direction data rate, which may sometimes be higher than the forward direction data rate.

Figure 6:
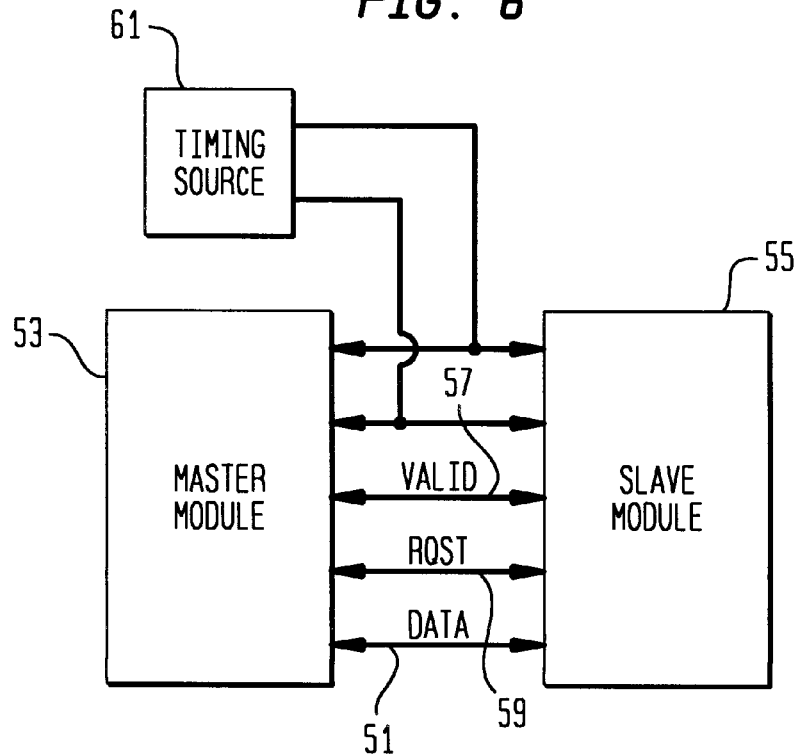
FIG. 6 is a block diagram illustrating a TDM bus system operating in accordance with the invention, with a master module at one end, a slave module at the other, and a timing source which controls both.

A specific example of an arrangement which will support any or all of the data stream types described above is shown in block diagram form in FIG. 6. In FIG. 6, a bilateral TDM bus 51 (which may take the form of separate TDM buses in opposite directions) transports data in a forward direction from a master module 53 to a slave module 55 and in a reverse direction from slave module 55 to master module 53. A validity identification signal (VIS) link 57 couples modules 55 and 57 in both directions independently of TDM bus 51, and a bandwidth request signal link 57 couples modules 55 and 57 in the forward direction from master module 55 to slave module 57. A timing source 61 provides appropriate timing signals to both master module 53 and slave module 55.

Figure 7:
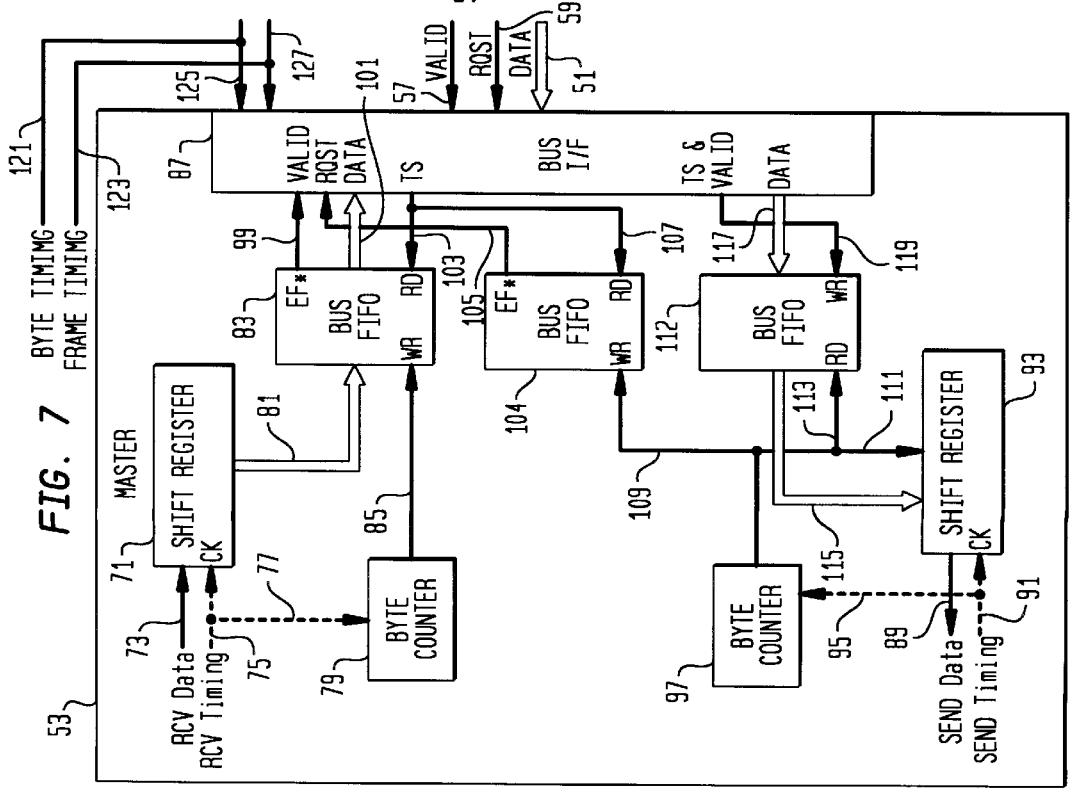
FIG. 7 is a block diagram of the master module illustrated in FIG. 6.

FIG. 7 is a block diagram of master module 53. In FIG. 7, a shift register 71 receives a data stream for transmission from an incoming data line (RCV Data) 73 and timing from a timing lead (RCV Timing) 75. Timing from lead 75 is also supplied over a timing lead 77 to a byte counter 79. Output from shift register 71 goes over a bus 81 to a bus FIFO (first in, first out) register 83, while output from byte counter 79 goes over a lead 85 to a write control input of bus FIFO 83. A bus interface (I/F) 87 serves as the final gatekeeper between bus FIFO 83 register and bilateral TDM bus 51.

Master module 53 sends incoming data received from slave module 55 (FIG. 6) in a stream to a data line (SEND Data) 89 and receives timing signals from a timing line (SEND Timing) 91. Data line 89 receives output from a shift register 93, receives signals at a clock input from timing line 91. Timing line 91 also supplies signals to a byte counter 97.

Bus interface 87 receives validity identification signals from a Not Empty flag (EF*) in bus FIFO register 83 over a lead 99, and data from an output of bus FIFO 83 register over a bus 101. Bus FIFO 83 register receives read signals (RD) from bus interface 87 over a lead 103. A bus FIFO register 104 supplies bandwidth request signals to bus interface 87 from a Not Empty flag (EF*) over a lead 105 and receives read signals (RD) from bus interface 87 over a lead 107. Bus FIFO register 104 receives write signals (WR) from byte counter 97 over a lead 109. Byte counter 97 supplies signals to shift register 93 over a lead 111 and to a bus FIFO register 112 over a lead 113. Bus FIFO register 112 supplies data to shift register 93 over a bus 115.

Bus interface 87 supplies incoming data received over bilateral TDM bus 51 from slave module 55 to bus FIFO 112 over a bus 117 and timing and validity signals (TS and VALID) to a write (WR) input of bus FIFO register 112 over a lead 119. Byte and frame timing signals from timing module 61 are received over byte timing lead 121 and frame timing lead 123, respectively, and supplied to bus interface 87 over leads 125 and 127, respectively.

Figure 8:
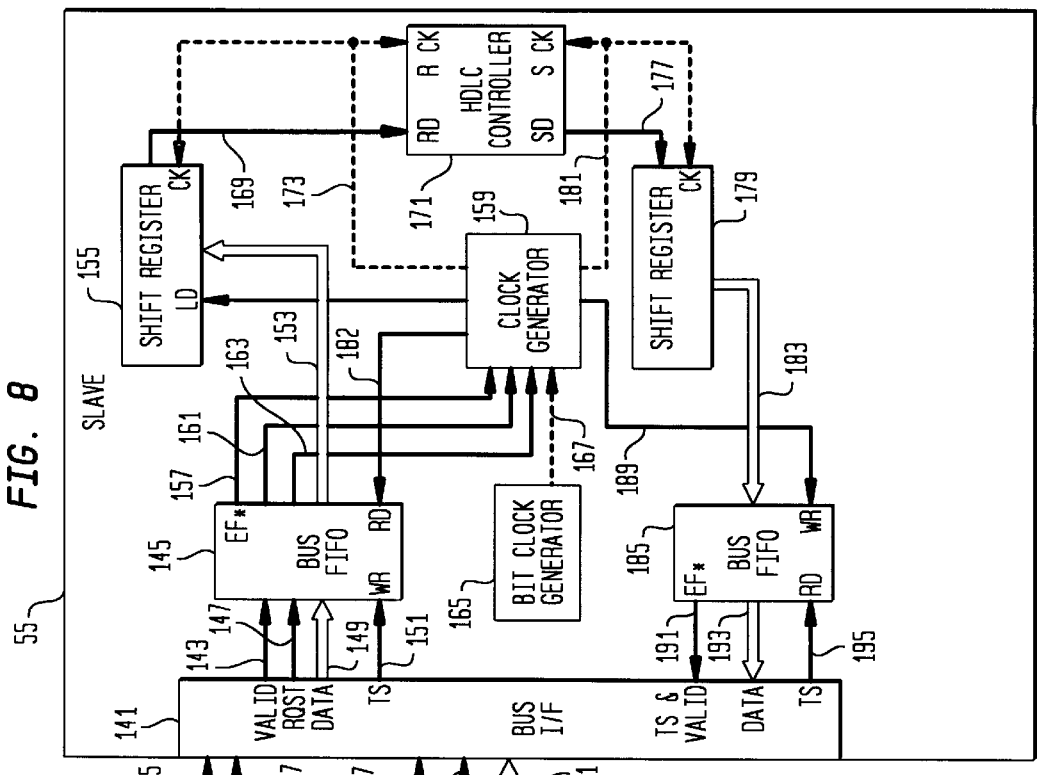
FIG. 8 is a block diagram of the slave module illustrated in FIG. 6.

FIG. 8 is a block diagram of slave module 55. In FIG. 8, a bus interface (I/F) 141 receives byte timing input from lead 125 and frame timing input from lead 127. Bus interface 141 also receives a main data stream from bilateral TDM bus 51, VALID signals from an input lead 57, and RQST signals from an input lead 59.

From bus interface 141 in FIG. 8, VALID signals are supplied over a lead 143 to an input of a bus FIFO register 145, and RQST signals are supplied over a lead 147 to another input of bus FIFO register 145. From bus interface 141, the incoming data stream received over bilateral TDM bus 51 from master module 53 is supplied to another input of bus FIFO 145 over a bus 149, and time slot decode signals (TS) are supplied to a write enable input of bus FIFO register 145 over a lead 151.

From bus FIFO register 145, the data stream is supplied over a bus 153 to an input of a shift register 155. Bit timing signals are supplied from a Not Empty flag (EF*) in bus FIFO register 145 over a lead 157 to a clock generator 159, and byte timing signals are supplied over a lead 161. Frame timing signals are supplied from bus FIFO 145 to clock generator 159 over a lead 163. A local bit clock generator 165 supplies signals to clock generator 159 over a lead 167. Shift register 155 supplies output over a lead 169 to a read input of a HDLC controller 171. Clock generator 159 supplies receive clock timing signals to both shift register 155 (CK) and HDLC controller 171 (R CK) over a lead 173. Output from HDLC controller 171 is supplied over a lead 177 to a shift register 179. Send clock timing signals from clock generator 159 are supplied to both HDLC controller 171 (S CK) and shift register 179 (CK) over a lead 181. Read signals (RD) are supplied to bus FIFO register 145 over a lead 182.

Although the details of HDLC controller 171 have no specific relation to the invention, a few words relating to its typical function may be in order. The data packets received by controller 171 for transmission are processed in the following manner. HDLC protocol (flags between packets, packet headers, and error check information) is stripped off, leaving the raw user data. The raw user data is generally stored in a RAM and then a message indicating the receipt of a valid packet is sent to another process. In the case of a packet switching system, this is generally the process managing an outgoing queue for another data link. The packet is then transmitted when the outgoing process indicates to its transmit HDLC controller (not shown, but similar to the one for the opposite direction of the incoming packet) the location in RAM of the data to be sent. The HDLC controller (which had been sending idle flags) then shifts out a header specified by the process (usually with information identifying the destination of the packet, followed by the data from the RAM and then followed by the error checking code.

The data stream to be transmitted over bilateral TDM bus 51 is passed from shift register 179 over a bus 183 to a bus FIFO register 185. Bus FIFO register 185 receives write signals (WR) from clock generator 159 over a lead 189. Time Slot Decode and VALID signals are passed from bus FIFO register 185 to bus interface 141 over a lead 191, and the outgoing data stream is passed from bus FIFO 185 to bus interface 141 over a bus 193. Finally, bus FIFO 185 receives a read signal (RD) from bus interface 141 over a lead 195.

Figure 9:
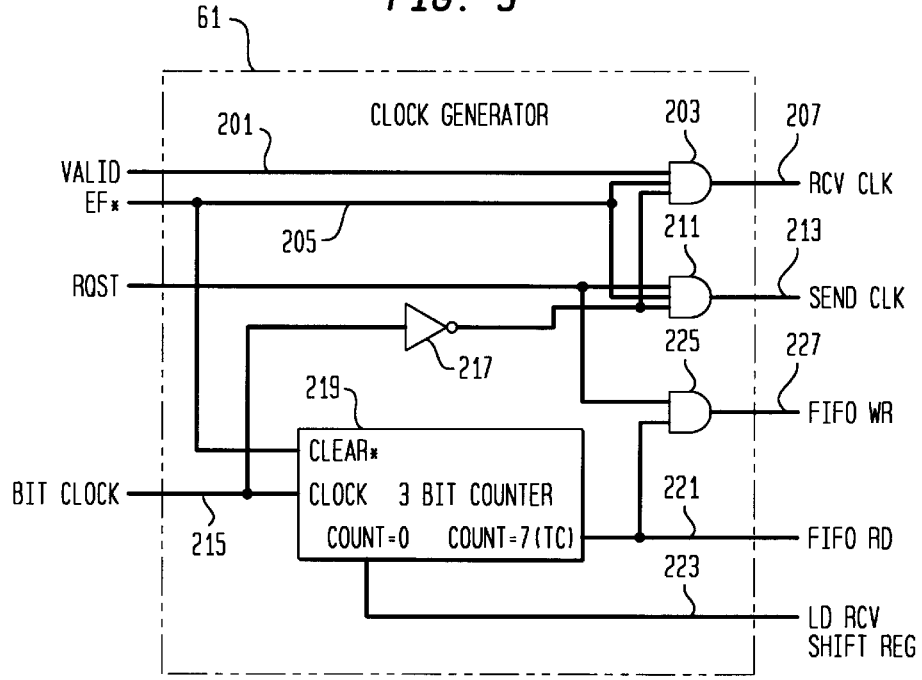
FIG. 9 is a block diagram of the timing source illustrated in FIG. 6.

FIG. 9 is a block diagram of timing source 61. As shown in FIG. 9, timing source 61 is a clock generator which includes an input lead 201 supplying a VALID signal to one input of an AND gate 203. Another input lead 205 supplies a Not Empty flag (EF*) signal to another input of AND gate 203. The single output of AND gate 202 supplies a receive clock (RCV CLK) signal to an output lead 207. An input lead 209 supplies a RQST signal to one input of an AND gate 211. Another input of AND gate 211 is driven by input lead 205, which carries the Not Empty flag (EF*). The single output of AND gate 211 supplies a send clock signal to an output lead 213.

An input lead 215 supplies a bit clock timing signal through an inverter 217 to another input of AND gate 203 and to another input of AND gate 211. Input lead 215 also supplies the same bit clock timing signal to a clock input of a 3-bit counter 219. Counter 219 also receives a clear input (EF*) from input lead 205. As output, counter 219 delivers a FIFO read signal to an output lead 221 and a timing signal to another output lead 223 (LD RCV and SHIFT REG). Finally, an AND gate 225 receives input from output lead 221 and from input lead 209. The single output of AND gate 225 is supplied to a FIFO write output lead 227.

Figure 10:
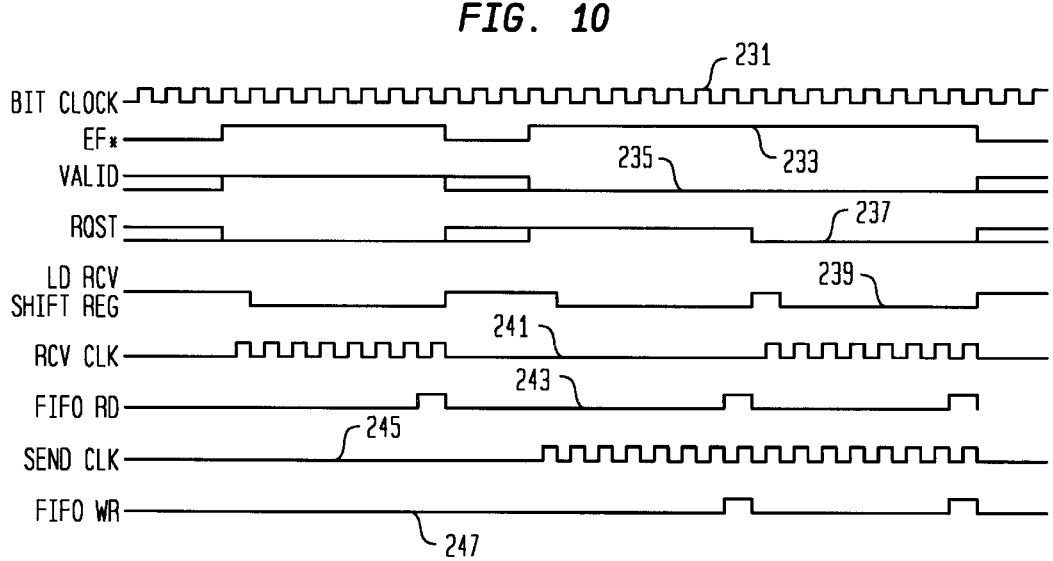
FIG. 10 illustrates wave forms controlling the operation of the portions of a TDM system shown in FIGS. 7, 8, and 9.

FIG. 10 is a timing diagram illustrating waveforms associated with clock generator 61. In FIG. 10, waveform 231 is the bit clock waveform supplied to counter 219 in FIG. 9 over input lead 215. Waveform 233 is the "Not Empty flag" signal supplied to counter 219 and AND gate 203 from input lead 205. Waveform 235 is the VALID signal carried by line 57 in FIGS. 6, 7, and 8. Waveform 237 is the RQST signal supplied to AND gate 211 in FIG. 9 over input lead 209. The significance of the double-valued segments of waveforms 235 and 237 is that when a FIFO register is empty, it has nothing to output, so VALID and RQST lines 161 and 163 become indeterminate. On such occasions, the FIFO register output is without significance. Waveform 239 is the output (LD RCV and SHIFT REG) from counter 219 in FIG. 9 on output line 223. Waveform 241 is the receive clock waveform generated on output lead 213 from AND gate 211 in FIG. 9. Waveform 243 is the FIFO read signal generated on output lead 221 by counter 219. Waveform 245 is the send clock waveform generated on output lead 213 from AND gate 211. Finally, waveform 247 is the FIFO read signal generated by counter 219 on output lead 221.

In FIG. 7, master module bus interface 87 uses byte timing and frame timing to derive the current time slot number via an internal time slot counter. This value is continuously compared to registers preconfigured with numbers of the time slots assigned for each module to transmit and receive on.

For each time slot allocated for master module 87 to transmit on, bus interface 87 presents TS to the read (RD) strobe of bus FIFO 83. TS (meaning time slot) is an indication from bus interface 87 that the current time slot on bus 51 is assigned for use by master module 87. If bus FIFO 83 is not empty as indicated by EF*, data is read from bus FIFO 83 and driven onto TDM bus 51 by bus interface 87 and a VALID signal is asserted on TDM bus 51.

In addition, the empty flag of bus FIFO 104 is used to generate a RQST signal on the same time slot in the following manner. Bus FIFO 104 is first initialized to a non-empty state by writing to it several times. This causes the first few bus time-slots to have the RQST signal asserted. The system is primed by causing slave module 55 to send data to master module 53 during its first few transmit time slots. This ultimately causes bus FIFO 112 to be partially filled and have a steady stream of data available for sending to the interface via shift register 93. Each time a byte is shifted to bus interface 87, bus FIFO 104 is written, keeping the RQST rate on TDM bus 51 equal to the byte rate at bus interface 89.

In FIG. 8, for each time slot allocated for slave module 55 to receive on, bus interface 141 writes a VALID signal, a RQST signal, and the data (if any) into bus FIFO 145. Bit clock generator 165 continuously reads bus FIFO 145 and, when an entry in bus FIFO 145 marked valid is read, it loads the data from bus FIFO 145 into shift register 155 and shifts it into HDLC controller 171. When a bus FIFO entry with the RQST signal asserted is read, clock generator 165 shifts a byte from HDLC controller 171 to shift register 179 and transfers the byte into bus FIFO 185.

For each time slot allocated to slave module 55 to transmit on, bus interface 141 reads bus FIFO 185 and, if it is not empty, transfers the data to TDM bus 51 with the VALID signal asserted. For each time-slot allocated to master module 53 to receive on, bus interface 81 writes data from TDM bus 51 into bus FIFO 112 only if the VALID signal is asserted. Each time another byte is shifted to bus interface 87, another byte is automatically read from bus FIFO 112 and transferred to reload shift register 93 in preparation for shifting the next byte.

It is to be understood that the embodiments of the invention which have been described are illustrative. Numerous other arrangements and modifications may be readily devised by those skilled in the art without departing from the spirit and scope of the invention.

I claim:

1. A method for transmitting at least one channel of digital data over a time division multiplex bus, where said channel comprises a sequence of data bytes, said bus carries a bit stream comprising sequential digital frames, each of said frames is divided into a plurality of sequential time slots, each of said time slots comprises a sequence of data byte transfer opportunities each of which is interleaved with respective data byte transfer opportunities of the remaining time slots, each of said time slots has the same predetermined bandwidth $b_t$, the bandwidth of said channel may be other than n times $b_t$, and n is a positive integer, said method comprising the steps of:

assigning said channel to a selected number m of said time slots, where m=n, $b_c$ is the bandwidth of said channel, and the relationship between $b_c$ and $b_t$ is given by the expression $(n-1)b_t < b_c \leq nb_t$;

generating a validity identification signal for each data byte transfer opportunity in said selected time slots;

transmitting sequential bytes of digital data from said channel over said bus during data byte transfer opportunities in said selected m time slots;

transmitting a first digital state as said validity identification signal substantially simultaneously with each data byte from said channel carried during data byte transfer opportunities by said bus in said selected m time slots; and transmitting a second digital state as said validity identification signal substantially simultaneously with each remaining data byte transfer opportunities in said bus in said selected m time slots.

2. The method of claim 1 in which data bytes are transmitted during all data byte transfer opportunities in the first (m−1)th of said selected time slots and during less than all data byte transfer opportunities in the (m)th of said selected time slots.

3. The method of claim 1 which includes the additional steps of:

receiving sequential data byte transfer opportunities from said bus in said m time slots;

accepting as valid data all bytes from said m time slots received during data byte transfer opportunities substantially contemporaneously with validity identification signals of said first digital state; and ignoring any contents of all data byte transfer opportunities in said m time slots received substantially contemporaneously with validity identification signals of said second digital state.

4. A method for transmitting at least a first channel of digital data in a first direction over a bidirectional time division multiplex bus and controlling transmission of at least a second channel of digital data in the opposite direction, where each of said channels comprises a sequence of data bytes, in each direction of transmission said bus carries a bit stream comprising sequential digital frames, each of said frames is divided into a plurality of sequential time slots, each of said time slots comprises a sequence of data byte transfer opportunities each of which is interleaved with respective data byte transfer opportunities of the remaining time slots, each of said time slots has the same predetermined bandwidth $b_t$, the bandwidth of each of said channels may be other than n times $b_t$, and n is a positive integer, said method comprising the steps of:

assigning said first channel to a selected number m of said time slots in said first direction, where m=n, $b_c$ is the bandwidth of said first channel, and the relationship between $b_c$ and $b_t$ is given by the expression $(n-1)b_t < b_c \leq mnb_t$;

generating a validity identification signal for each data byte transfer opportunity in said selected time slots in said first direction;

transmitting sequential bytes of digital data from said channel over said bus during data byte transfer opportunities in said selected m time slots in said first direction;

transmitting a first digital state as said validity identification signal substantially simultaneously with each data byte from said channel carried during data byte transfer opportunities by said bus in said selected m time slots in said first direction;

transmitting a second digital state as said validity identification signal substantially simultaneously with each remaining data byte transfer opportunities in said bus in said selected m time slots in said first direction;

generating a bandwidth request signal for each data byte transfer opportunity in time slots in said first direction;

transmitting a first digital state as said bandwidth request signal substantially simultaneously with enough data byte transfer opportunities in said bus in said selected m time slots in said first direction so that sufficient bandwidth is provided in said opposite direction to accommodate said second channel; and transmitting a second digital state as said bandwidth request signal substantially simultaneously with each remaining data byte transfer opportunity in said bus in said selected m time slots in said first direction.

5. The method of claim 4 in which each transmission of said first digital state as said bandwidth request signal causes a byte of data of said second channel to be transmitted in said opposite direction along with said first digital state as said validity identification signal in said opposite direction.

6. A terminal for transmitting at least one channel of digital data over a time division multiplex bus, where said channel comprises a sequence of data bytes, said bus carries a bit stream comprising sequential digital frames, each of said frames is divided into a plurality of sequential time slots, each of said time slots comprises a sequence of data byte transfer opportunities each of which is interleaved with respective data byte transfer opportunities of the remaining time slots, each of said time slots has the same predetermined bandwidth $b_t$, the bandwidth of said channel may be other than n times $b_t$, and n is a positive integer, said terminal comprising:

means for assigning said channel to a selected number m of said time slots, where m=n, $b_c$ is the bandwidth of said channel, and the relationship between $b_c$ and $b_t$ is given by the expression $(n-1)b_t < b_c \leq mnb_t$;

means for generating a validity identification signal for each data byte transfer opportunity in said selected time slots;

means for transmitting sequential bytes of digital data from said channel over said bus during data byte transfer opportunities in said selected m time slots;

means for transmitting a first digital state as said validity identification signal substantially simultaneously with each data byte from said channel carried during data byte transfer opportunities by said bus in said selected m time slots; and means for transmitting a second digital state as said validity identification signal substantially simultaneously with each remaining data byte transfer opportunities in said bus in said selected m time slots.

7. The terminal of claim 6 in which data bytes are transmitted during all data byte transfer opportunities in the first (m−1)th of said selected time slots and during less than all data byte transfer opportunities in the (m)th of said selected time slots.

8. A receiver for digital data transmitted by the terminal of claim 6 which comprises:

means for receiving sequential data byte transfer opportunities from said bus in said m time slots;

means for accepting as valid data all bytes from said m time slots received during data byte transfer opportunities substantially contemporaneously with validity identification signals of said first digital state; and means for ignoring any contents of all data byte transfer opportunities in said m time slots received substantially contemporaneously with validity identification signals of said second digital state.

9. A system for transmitting at least a first channel of digital data in a first direction over a bidirectional time division multiplex bus and controlling transmission of at least a second channel of digital data in the opposite direction, where each of said channels comprises a sequence of data bytes, in each direction of transmission said bus carries a bit stream comprising sequential digital frames, each of said frames is divided into a plurality of sequential time slots, each of said time slots comprises a sequence of data byte transfer opportunities each of which is interleaved with respective data byte transfer opportunities of the remaining time slots, each of said time slots has the same predetermined bandwidth $b_t$, the bandwidth of each of said channels may be other than n times $b_t$, and n is a positive integer, said method comprising the steps of:

means for assigning said first channel to a selected number m of said time slots in said first direction, where m=n, $b_c$ is the bandwidth of said first channel and the relationship between $b_c$ and $b_t$ is given by the expression $(n-1)b_t < b_c \leq mnb_t$;

means for generating a validity identification signal for each data byte transfer opportunity in said selected time slots in said first direction;

means for transmitting sequential bytes of digital data from said channel over said bus during data byte transfer opportunities in said selected m time slots in said first direction;

means for transmitting a first digital state as said validity identification signal substantially simultaneously with each data byte from said channel carried during data byte transfer opportunities by said bus in said selected m time slots in said first direction;

means for transmitting a second digital state as said validity identification signal substantially simultaneously with each remaining data byte transfer opportunities in said bus in said selected m time slots in said first direction;

means for generating a bandwidth request signal for each data byte transfer opportunity in time slots in said first direction;

means for transmitting a first digital state as said bandwidth request signal substantially simultaneously with enough data byte transfer opportunities in said bus in said selected m time slots in said first direction so that sufficient bandwidth is provided in said opposite direction to accommodate said second channel; and means for transmitting a second digital state as said bandwidth request signal substantially simultaneously with each remaining data byte transfer opportunity in said bus in said selected m time slots in said first direction.

10. The system of claim 9 in which each transmission of said first digital state as said bandwidth request signal causes a byte of data of said second channel to be transmitted in said opposite direction along with said first digital state as said validity identification signal in said opposite direction.

* * * * *